United States Patent Office 3,310,574
Patented Mar. 21, 1967

3,310,574
METHOD OF PRODUCING TRIALKYLINDIUM
Enno Todt and Hans Hauschildt, both of Erlangen, Germany, assignors to Siemens-Schuckertwerke Aktiengesellschaft, Berlin-Siemensstadt, Germany, a corporation of Germany
No Drawing. Filed Dec. 26, 1961, Ser. No. 162,212
Claims priority, application Germany, Dec. 23, 1960,
S 71,800
10 Claims. (Cl. 260—429)

Our invention relates to a method of producing trialkylindium.

Alkylindium has heretofore been produces by conversion of indium halides, particularly indium chloride, with the corresponding Grignard compounds. Disregarding the production of the Grignard compounds, this method consists essentially of two stages, namely the production of indium halide from metallic indium, and the above-mentioned conversion. The indium halogenation encounters the danger of introducing impurities into the resultant alkylindium. This is particularly undesirable if the alkylindium is to be used as an intermediate product in the manufacture of extremely pure indium such as is required in the manufacture of electronic semiconductor devices.

It is an object of our invention to produce a method, for the production of trialkylindium, which avoids the above-mentioned disadvantages by not requiring halogenation of indium.

According to our invention, chips or similar particles of indium and magnesium, or of an indium-magnesium alloy, are converted with an alkyl halide in ether solution. The resulting alkylindium is separated, for example, by vacuum distillation or extraction. Alkylindium is, thereby, obtained directly in one reaction step from metallic indium. The alkylindium produced by our method is of high purity and is especially useful in the production of extremely pure indium for electronic semiconductor purposes.

We prefer to use at least 1.5 moles magnesium and at least 3 moles alkyl halide per 1 mole of indium, although other proportions can be used. In detail, the method can be performed as follows. Chips of indium and magnesium are mixed together in corresponding quantities. However, corresponding quantities of indium and magnesium can also be melted together and the alloy can subsequently be reduced to chips. The reaction of the chips with the alkyl halide is initially exothermal. However, toward the end of the reaction, heat must be supplied for complete conversion of indium. All metals which cannot form alkyls under the conditions of the method are retained in the non-converted residue. The conversion product is decanted off from the non-converted residue, and the ether is distilled off. Thereafter the alkylindium can be separated by vacuum distillation or extraction.

In the distillation, the lower alkyl indiums occur mainly as etherates, whereas the higher alkyls occur practically free of ether. To avoid the occurrence of the dissociation products, this being important particularly with the higher alkyl indiums, it is advisable to extract the alkyl indiums from the conversion mass with the aid of organic solvents, for example benzene or hexane. In this case, also, the ether is previously removed by distillation.

Trialkylindiums produced by the method according to the invention are not only suitable as starting substances in the production of indium for semiconductor purposes, but are also important, on account of their high degree of purity, as an intermediate product for further reactions, for example, for the production of alkylindium complexes with the aid of alkali or ammonium halides or, to mention another example, for the production of polymerization catalysts.

To further describe the method of the invention, reference may be had to the following examples.

Example 1

34.4 g. indium chips (=0.3 mole) and 32.8 g. magnesium chips (=1.35 moles) were placed into a suitable reaction vessel, for example a three-neck round bottom flask fitted with a reflux condenser, stirrer and drip funnel. A solution of 512 g. ethyl bromide (=4.7 moles) in 1.4 liters of absolute ether was slowly supplied by dropwise addition. The drop rate was so chosen that the reaction took place under slight boiling. Thereafter, boiling was effected for a few hours at reflux until nearly the entire metal was converted. There remained a residue, containing the metals that do not form alkyl compounds. The quantity of the residue, therefore, is dependent upon the degree of purity of the starting materials. After the conversion product was decanted off and the ether was distilled off, an amount of 59 g. triethylindium was obtained by distillation at 83 to 84° C. under a pressure of 12 mm. Hg, this triethylindium still containing a slight amount of ether. By again distilling the product, a quantity of 43.7 g. ether-free triethylindium was obtained, corresponding to a yield of 72% relative to the indium employed as starting material.

Example 2

61 g. of chips obtained by mechanically reducing an indium-magnesium alloy containing 34 g. indium (=0.296 mole) and 27 g. magnesium (=1.11 moles) were placed into the reaction vessel, such as described in Example 1. A solution of 360 g. ethyl bromide (=3.3 moles) in 1.7 liters absolute ether was slowly supplied in drops with occasional stirring. Boiling was subsequently maintained for a few hours at reflux until the alloy was nearly completely converted. The conversion product was decanted off, and the ether was distilled off. Further distillation in water-jet vacuum through a small column resulted in 47 g. ether-free triethylindium. This corresponds to a yield of 78% relative to the quantity of the indium employed as starting material.

Example 3

55 g. of an indium-magnesium alloy mechanically reduced to chips containing 29.8 g. indium (=0.26 mole) and 25.2 g. magnesium (=1.04 moles) were placed into the reaction vessel, as described in Example 1. A solution of 480 g. isopropylbromide (=3.9 moles) in 1.3 liters of absolute ether were supplied slowly in drops under stirring. Thereafter boiling was maintained for a few hours at reflux until the alloy was nearly completely converted. The conversion product was decanted off from the non-converted metal residue, enriched by the foreign elements contained in the starting alloy. After distilling off the ether, a further distillation at 86.5 to 88° C. and at a pressure of 12 mm. Hg resulted in 27 g. triisopropylindium. This corresponds to a yield of 42.6% relative to the indium employed as starting material.

*Example 4*

56.3 g. of indium-magnesium alloy mechanically reduced to chips and consisting of 34.4 g. indium (=0.3 mole) and 21.9 g. magnesium (=0.9 mole) were added to the reaction vessel, such as described in Example 1. A solution of 327 g. ethyl bromide (3 moles) in 1.2 liters ether were dripped slowly into the vessel under stirring. Thereafter, boiling was maintained for a few hours at reflux until the alloy was nearly completely converted. The ether was then distilled off as well as possible. Thereafter 0.3 liter of n-hexane were added. The resulting precipitate was repeatedly washed with n-hexane. All the n-hexane solutions were then poured together and a quantity of 31 g. triethylindium was obtained therefrom by distillation. This corresponds to a yield of 51%.

The trialkylindiums produced in accordance with the foregoing examples, when subjected to thermal dissociation, result in metallic indium in which substantially all metallic impurities are eliminated to below the spectral-analytical detection limit. This applies, for example, to the elements silver, aluminum, cadmium, cobalt, manganese, nickel, tin, zinc, copper, iron and silicon. If there are metallic impurities above the detection limit, such as lead for example, and if an extremely pure indium is to be produced, it is advisable to perform a fractional distillation before subjecting the alkylindium to thermal dissociation.

*Example 5*

66 g. of an In-Mg alloy mechanically reduced to chips and containing 38.3 g. In (=0.33 mole) and 27.7 g. Mg (=1.14 moles) were disposed into a reaction vessel, such as described under Example 1. The chips were then covered in the vessel with 100 ml. ether. Thereafter gaseous methyl bromide, $CH_3Br$, was introduced into the reaction vessel and ether was slowly dropwise added. The reaction vessel is provided with a gas supply pipe for introducing the $CH_3Br$. The reaction was initiated by short-lasting heating. Such initiation is promoted by adding a granule of iodine. The addition of ether (in a total amount of 1600 ml.) and of $CH_3Br$ (at least 237 g.=2.5 moles) was effected under stirring so that the reaction was maintained under slight boiling. When the heat generation declined, additional heat was supplied until the alloy was nearly completely converted. This took place in approximately 20 hours. Thereafter the ether was distilled off to a great extent. By distilling at 47 to 62° C. under 12 mm. Hg pressure, $In(CH_3)_3$ was obtained still containing some ether and having an indium content of 52.2%. This corresponds to a yield in pure $In(CH_3)_3$ of 87.3%, relative to the indium used as starting material. By repeated extraction with addition of 50 ml. benzene, and subsequent separation of the ether-containing benzene at 66 to 67° C. and 12 mm. Hg, pure $In(CH_3)_3$ in the form of colorless needles was obtained.

*Example 6*

66 g. of chips produced from an In-Mg alloy with 38.3 g. In (=0.33 mole) and 27.7 g. Mg (=1.4 moles) were placed into the reaction vessel, such as described in Example 1. The chips were covered with 100 ml. ether. A solution of 390 g. of ethyl iodide, $C_2H_5I$ (2.5 moles) in 1100 ml. ether was slowly dropwise added. The reaction was initiated by short-lasting heating. The drip speed was so chosen that the reaction remained at slight boiling. Thereafter boiling was maintained for an additional time of 1½ hours at a reflux. The remaining non-converted metal residue consists mainly of those impurities of the starting alloy that cannot form alkyls under the above-mentioned reaction condition. This residue was removed by decantation. The ether was distilled off. Thereafter, distillation in water-jet vacuum at 82 to 84° C. under a pressure of 12 mm. Hg resulted in 91.0 g. of $In(C_2H_5)_3$ with an In-content of 39.94%, still containing a slight amount of ether. This corresponds to a yield in ether-free $In(C_2H_5)_3$ of 94.7% relative to the indium used as starting material. Through subsequent distillation, using a small column, pure $In(C_2H_5)_3$ was obtained.

An alkyl chloride, for example $C_2H_5Cl$ in lieu of alkyl iodide or bromide can be used in a completely analogous manner. The term "halide" as used herein refers to the group consisting of chloride, bromide and iodide. Higher alkyl halides than those of the specific examples are also suitable.

We claim:

1. The method of producing trialkylindium which comprises reacting chips of indium and magnesium with an alkyl halide in ether solution and separating the resulting trialkylindum.

2. The method of producing trialkylindium which comprises reacting chips of indium and magnesium with an alkyl halide in ether solution, separating the reaction products from the non-reacted residue and recovering the trialkylindium from the reaction products.

3. The method of producing trialkylindium which comprises reacting chips of indium and magnesium with an alkyl halide in ether solution, separating the reaction products from the non-reacted residue and recovering the trialkylindium from the reaction products by a step selected from the group consisting of vacuum distillation and extraction.

4. The method of producing trialkylindium which comprises reacting chips of indium and magnesium with an alkyl halide in ether solution, separating the reaction products from the non-reacted residue and recovering the trialkylindium from the reaction products by extraction with an organic solvent.

5. The method of producing trialkylindium which comprises reacting chips of indium and magnesium with an alkyl halide in ether solution, the mole ratio of magnesium to indium being at least 1.5:1 and the mole ratio of alkyl halide to indium being at least 3:1, separating the reaction products from the non-reacted residue and recovering the trialkylindium from the reaction products.

6. The method of producing triethylindium which comprises reacting chips of magnesium and indium in a mole ratio of at least 1.5:1 with at least 3 moles of ethylbromide per mole of indium, in an absolute ether medium, separating the reaction products from the unreacted residue and recovering triethylindium from the reaction products.

7. The method of producing triethylindium which comprises reacting chips of an alloy of indium and magnesium containing a mole ratio of magnesium to indium of at least 1.5:1 with at least 3 moles of ethylbromide per mole of inidum, in an absolute ether medium, separating the reaction products from the reacted residue and recovering triethylindium from the reaction products.

8. The method of producing triisopropylindium which comprises reacting chips of an indium-magnesium alloy containing a mole ratio of magnesium to indium of at least 1.5:1 with at least 3 moles of isopropylbromide per mole of indium in an ether medium, separating the reaction products from the unreacted residue and recovering triisopropylindium from the reaction products.

9. The method of producing trimethylindium which comprises reacting chips of an alloy of indium and magnesium containing a mole ratio of magnesium to indium of at least 1.5:1 with at least 3 moles of methylbromide per mole of indium, in an absolute ether medium, separating the reaction products from the reacted residue and recovering trimethylindium from the reaction products.

10. The method of producing triethylindium which comprises reacting chips of an alloy of indium and magnesium containing a mole ratio of magnesium to indium of at least 1.5:1 with at least 3 moles of ethyliodide per mole of indium, in an absolute ether medium, separating the reaction products from the reacted residue and recovering triethylindium from the reaction products.

References Cited by the Examiner

UNITED STATES PATENTS 2,958,703  11/1960  Nowlin et al. _____ 260—448

FOREIGN PATENTS 226,222  12/1959  Australia.

OTHER REFERENCES

Coates: "Organo-Metallic Compounds" (John Wiley and Sons, Inc., New York), 2nd edition (1960), pages 151 and 152.

TOBIAS E. LEVOW, *Primary Examiner.*

T. L. IAPALUCCI, A. P. DEMERS,
*Assistant Examiners.*